Dec. 1, 1964   M. W. PATRICK   3,159,212
TEMPERATURE CONTROL SYSTEM WITH PORTABLE THERMOSTAT
Filed July 10, 1962   4 Sheets-Sheet 1

INVENTOR
MALCOLM W. PATRICK

BY Strauch, Nolan & Neale
ATTORNEYS

Dec. 1, 1964  M. W. PATRICK  3,159,212
TEMPERATURE CONTROL SYSTEM WITH PORTABLE THERMOSTAT
Filed July 10, 1962  4 Sheets-Sheet 2
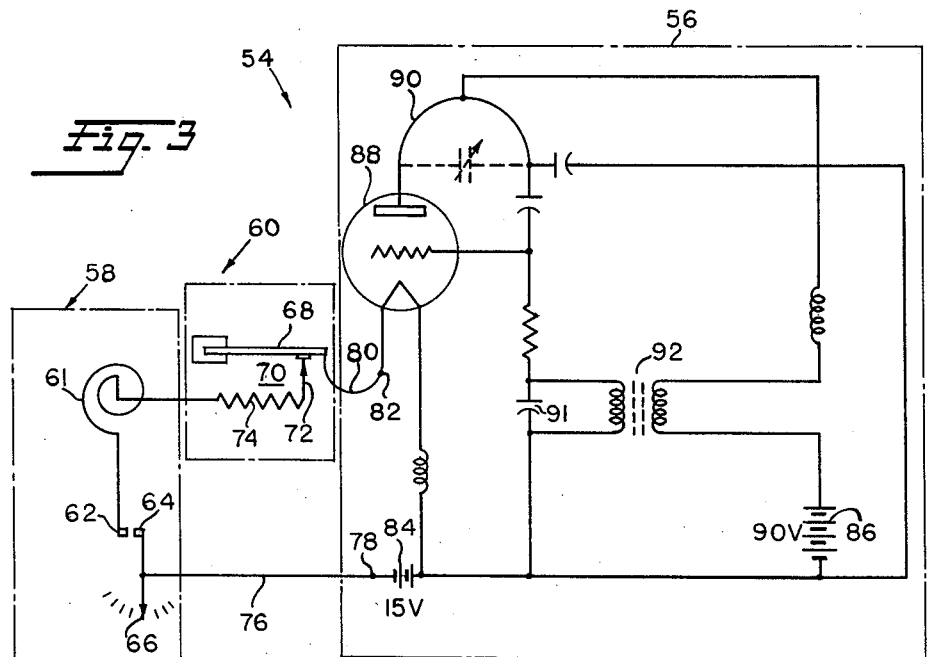
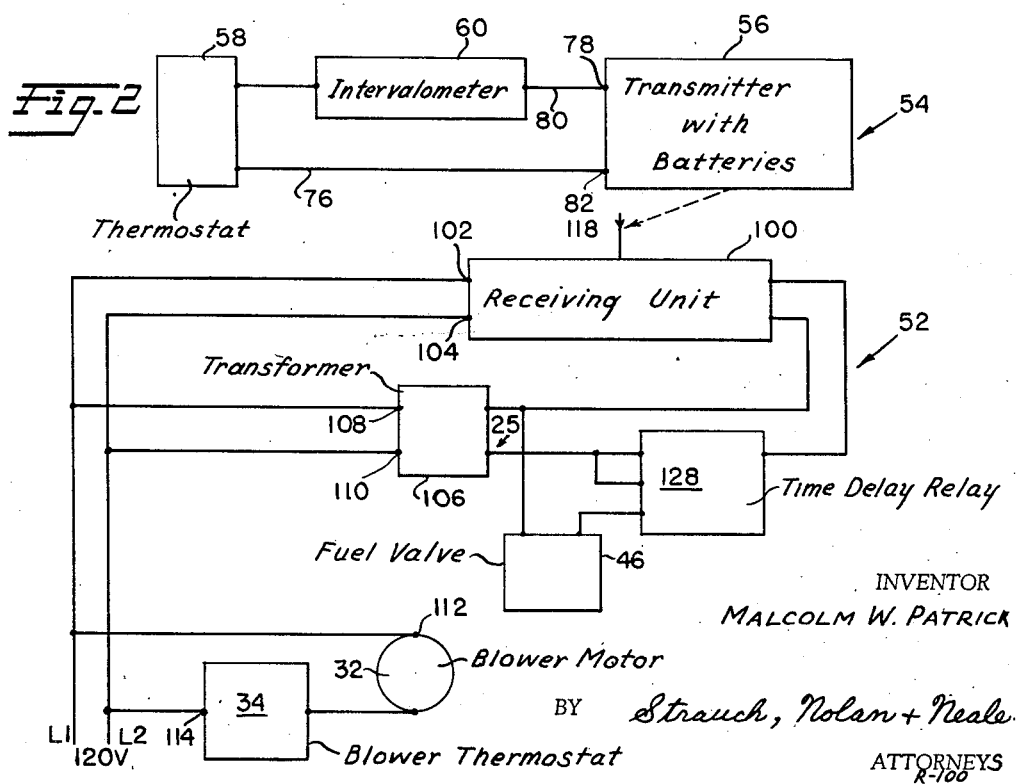
INVENTOR
MALCOLM W. PATRICK
BY Strauch, Nolan + Neale
ATTORNEYS Dec. 1, 1964   M. W. PATRICK   3,159,212
TEMPERATURE CONTROL SYSTEM WITH PORTABLE THERMOSTAT
Filed July 10, 1962   4 Sheets-Sheet 3
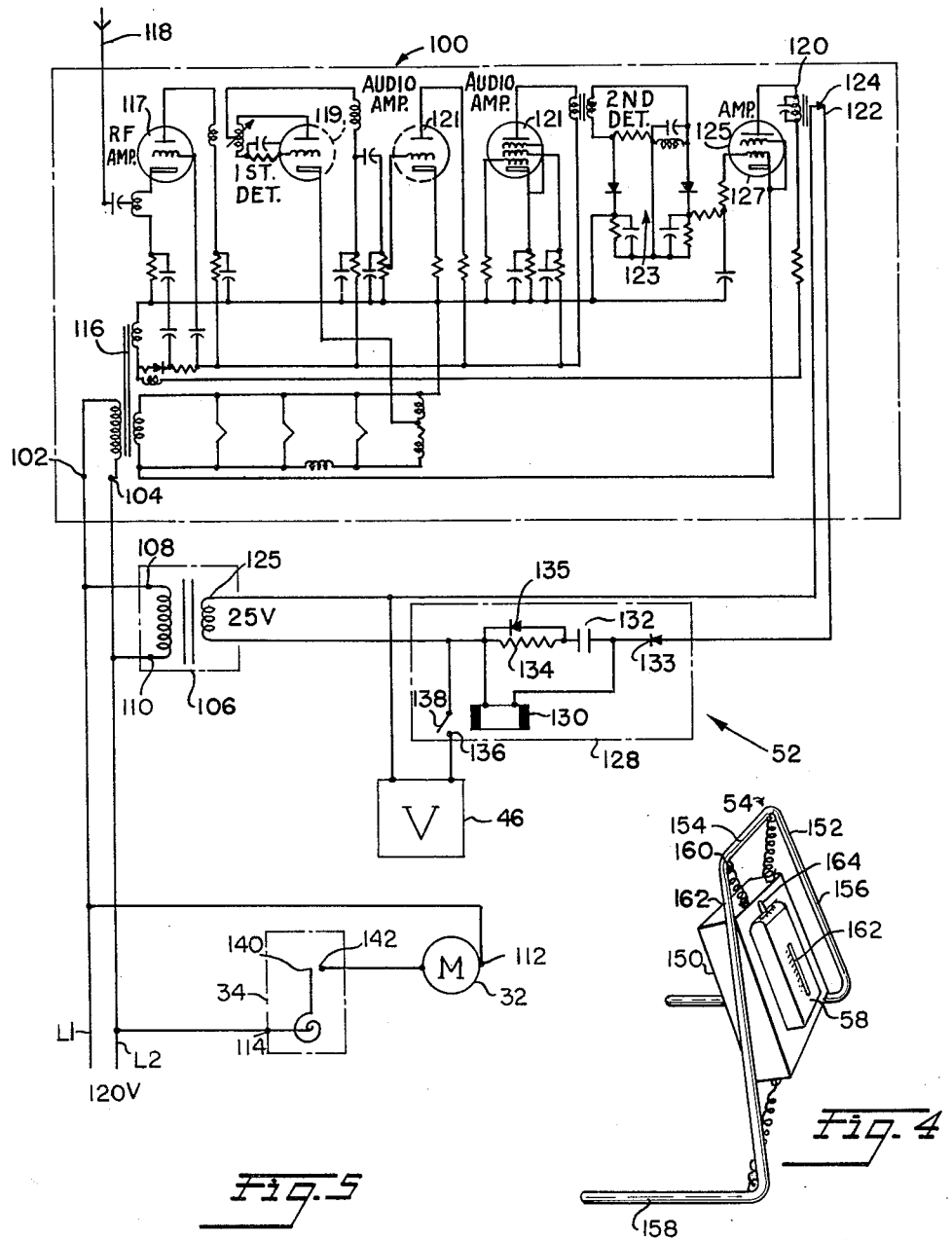
INVENTOR
MALCOLM W. PATRICK
BY Strauch, Nolan & Neale
ATTORNEYS

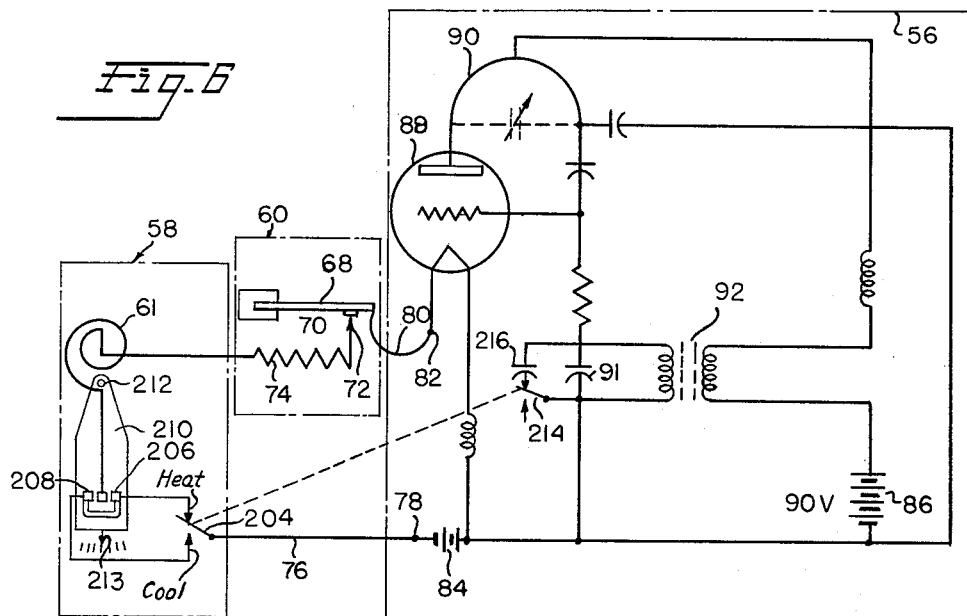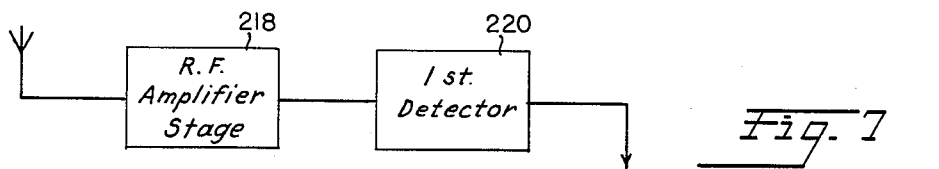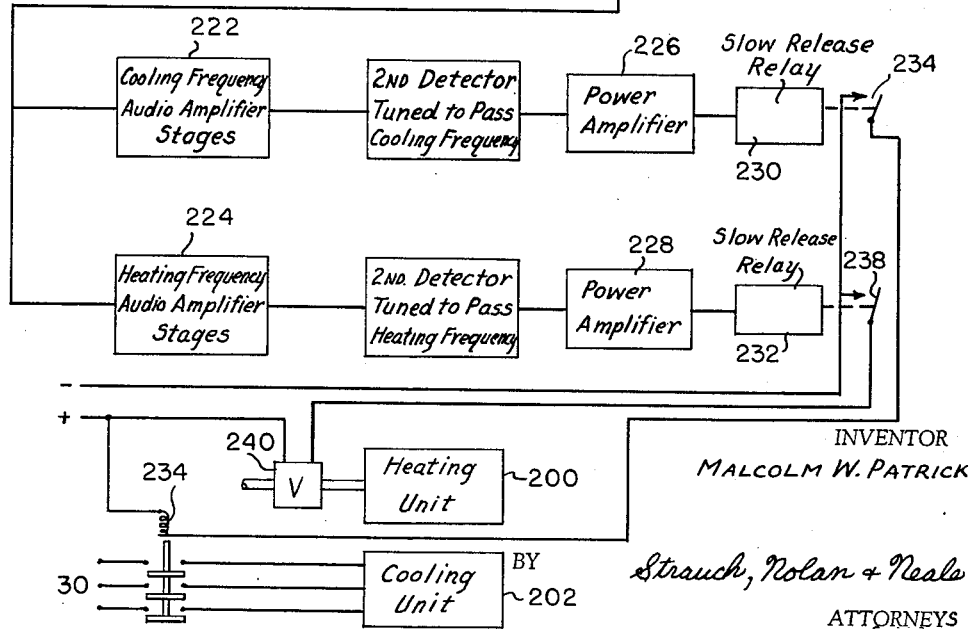

United States Patent Office 3,159,212
Patented Dec. 1, 1964

3,159,212
TEMPERATURE CONTROL SYSTEM WITH
PORTABLE THERMOSTAT
Malcolm W. Patrick, Bedford, Ohio, assignor to Hupp
Corporation, Cleveland, Ohio, a corporation of Virginia
Filed July 10, 1962, Ser. No. 208,790
8 Claims. (Cl. 165—26)

This invention relates to thermostatic control, and more specifically to a method and apparatus for controlling and regulating a heating and/or cooling system to maintain a suitable temperature in a home by means of a remotely located thermostat unit.

Heretofore, thermostatic controls for home use have usually been attached to a wall at some suitable point and wired to control the input to a furnace or air-conditioning unit. To control the temperature at different points in the home, the usual practice has been to provide zone heat with several thermostats and individual controls for each zone, thus adding much expensive apparatus to the single point control and making such systems too costly for use in the average home. Where duplicate wiring has been installed to several locations for a single thermostat which could thus be moved from outlet to outlet between any of the several locations and plugged in at the point desired, the need for a multiplicity of thermostats is eliminated; however, a relatively expensive wiring installation is required and a limited number of control points are provided.

It is often very desirable to be able to move the thermostat from one part of the house to another. For instance, the thermostat is normally located in and controls the temperature of the living room. But if the living room is unoccupied and there are children in a playroom, it is much more important that the temperature of the playroom be regulated. If the housewife is home alone and working in the kitchen, it is the kitchen temperature which should be controlled. At night, the bedroom temperature should usually govern the operation of the heating plant. Prior systems of the type having a portable thermostat are represented by Patent No. 2,367,609 dated September 5, 1944.

A principal object of the present invention is to provide a novel air temperature conditioning system having a portable thermostat that may be readily moved from room to room to thus regulate and control the heating and/or cooling system in accordance with the comfort requirements at various locations in a home where the occupants are located.

Another object of the invention is to provide a novel portable thermostat that utilizes an electronic oscillator that generates radio frequency signals for controlling a heating and/or cooling system.

A further object is to provide an improved system for operating the oscillator circuit as infrequently as possible to reduce power requirements for the portable thermostat unit and to reduce the period of radiation of radio frequency energy which might interfere with operation of other electronic apparatus. In this respect, the oscillator circuit is energized by the thermostat only when the room temperature deviates from the setting of the thermostat and an intervalometer is provided to key the oscillator circuit off and on when it would otherwise be operating continuously. By operating the circuit for a short time interval of only a second or so with the "off" periods extending for at least 10 times the length of an "on" period and preferably as long as a minute, a signal strength sufficient to assure reliable operation of the heating or cooling unit may be provided with minimum power requirements imposed on the batteries in the portable thermostat unit. Also, movement of objects that might shield or otherwise vary the strength of the transmitted signal at the receiver station to cause erratic operation of the heating or cooling unit is not as likely to affect the system since a holding arrangement involving the use of a time delay means is provided at the location of the heating or cooling unit to retain the unit energized when operating for a period well in excess of the "off" period of the oscillator circuit in the thermostat unit.

Another object of this invention is to provide an improved control system for the heating or cooling unit that is further protected against erratic operation due to reception of noise or other undesired signals. This may be achieved by modulation of the carrier wave with a signal that is unique to the heating or cooling unit that is desired to be controlled. One relatively simple arrangement involves modulation of a radio frequency carrier with an audio frequency and use of a receiver that is tuned to the carrier to thereby exclude radio frequency signals at other than the desired frequency, followed by a first detector stage and audio frequency amplifier stage(s) followed by a second detector stage and tuned filter circuit to pass only the desired modulation frequency signal. This later signal is then used to actuate a control circuit for the heating or cooling unit. Where the transmitted signal consists of pulses occurring once every minute or so, a suitable time delay device may be in the form of a slow release relay that maintains the fuel valve to the furnace open in case of a heating system or maintains the electric circuit to the cooling unit closed in the case of a cooling system.

Another object is to provide an improved resilient mounting arrangement for the portable thermostat and transmitter which comprise the portable temperature control unit to isolate the bimetal contacts of both the thermostat and the intervalometer or timer mechanism against vibration and shock forces when the thermostat unit is moved from one location to another to reduce the likelihood of the system operating sporadically when the thermostat is moved from one location to another.

Further objects of the invention are to provide such a thermostatic control which is simple and practical to manufacture, which incorporates standard commercial components, which can be manufactured at a reasonable cost and which is compact and suitable for use in the home.

These and other objects of the invention will be apparent from the claims and from the following description when read in conjunction with the accompanying drawings wherein:

FIGURE 2 is a block diagram showing the relation of the elements of the control system;

FIGURE 3 is a wiring diagram of an exemplary thermostatic control and transmitting unit;

FIGURE 4 is a perspective view of a typical thermostat housing and associated parts;

FIGURE 5 is a wiring diagram of an exemplary receiving unit and associated controls;

FIGURE 6 is a wiring diagram of the transmitter circuit of FIGURE 3 modified to control an air temperature control system comprising both a heating unit and a cooling unit; and FIGURE 7 is a block diagram of a receiving unit similar to that of FIGURE 5 but modified to control both a heating unit and a cooling unit.

Figure 1:
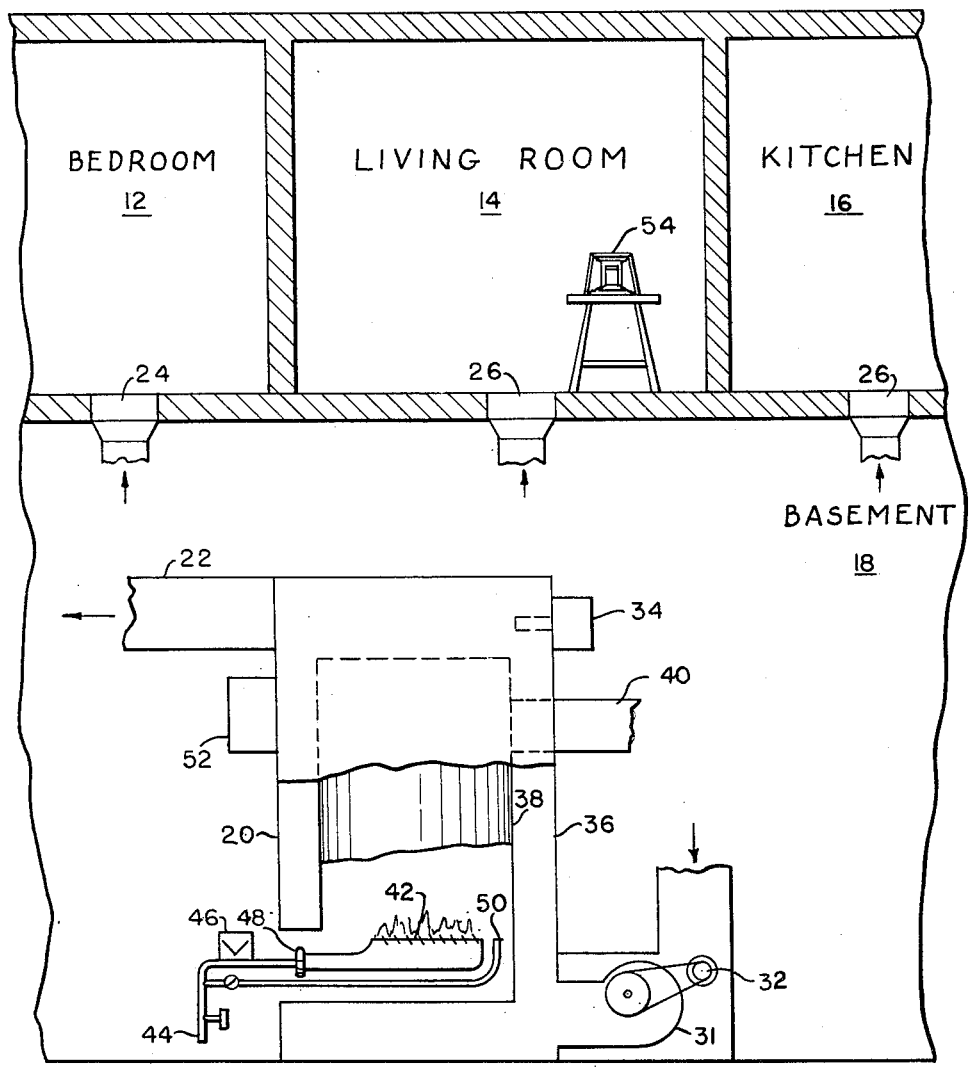
FIGURE 1 is a schematic sectional elevation of a house in which a control system according to the present invention has been installed.

Referring now to FIGURE 1, the temperature control system is illustrated as being installed in a home which may have rooms such as a bedroom 12, a living room 14 and a kitchen 16 on one level and a basement 18 below, in which is installed an air temperature control plant such as a heating unit indicated generally at 20.

The heating unit 20 may have a warm air outlet 22 connected through the usual ductwork to grills 24, 26 and 28 installed as at the baseboards of the bedroom, living room and kitchen respectively, and may supply heated air to these rooms when the heating unit is in operation. Air from the rooms is normally returned to the heating unit through the usual return air ducts which connect to the lower part of the heating unit as at 30. The flow of air is indicated by the arrows in FIGURE 1. The circulation of air typically produced by a blower 31 driven by a motor 32 under control of a blower thermostat 34 which connects the motor to the electric power lines when the air within the furnace is warm.

The furnace has a casing 36 and a combustion chamber 38, the latter being connected to a flue 40. The air being heated is outside of the combustion chamber. Within the chamber is a burner 42 which receives a supply of fuel such as gas from line 44, the gas flow to the burner being controlled by an electrically powered solenoid operated valve 46. Air for combustion flows into combustion chamber 38 as through a duct 48. A constantly burning pilot fire 50 ignites the gas at burner 42 when valve 46 is open. The usual safety controls (not shown) may be provided to prevent fuel flow if the pilot is not lit or if the furnace temperature becomes excessively high.

Mounted adjacent to or on the furnace casing is the novel control unit 52 of the present invention which (as will be explained below) contains the apparatus to open or close main fuel valve 46 to control the supply of heat to the house. Within the house is a novel portable thermostatic heat regulator 54 made in accordance with the present invention which may be placed at any point at which it is desired to control the temperature. For example, if in the daytime the housewife is working in the kitchen, it could be placed there. In the evening with the family in the living room, it could be moved to that room. At night it could be placed beside the bed in the master bedroom, set for low night temperature; and in the morning, the setting could be increased before time for the family to arise.

As shown in FIGURES 2 and 3, thermostat unit 54 includes a transmitter 56, a thermostat 58 and an intervalometer or timer 60. Thermostat 58 may have a bimetal coil 61 (see FIGURE 3) which moves a contact 62 as the bimetal temperature changes, and also may have an adjustable, cooperating contact 64 which can be set according to graduations 66 to the temperature to be maintained. The actual design of thermostat 58 is not critical, and any conventional type of room thermostat is useable excepting that for purposes of keeping the unit easily portable, a simplified form of thermostat is preferred.

Intervalometer or timer 60 may be of any one of several constructions that are used to periodically open and close a pair of contacts during time that thermostat contacts 62 and 64 are closed. The intervalometer here illustrated does not require operating power except during the time that the thermostat is calling for heat, and is of the type having a bimetal strip 68 carrying a movable contact 70 which is normally closed against a fixed contact 72. A resistance heater 74 is located adjacent to bimetal 68 so that when thermostat contacts 62 and 64 close, current flows through resistance heater 74 to cause heating and subsequent deflection upwardly of bimetal 68 thus separating contacts 70 and 72.

A conductor 76 connects contact 64 of the thermostat with one terminal 78 of the transmitter housing 56, while a flexible lead 80 connects contact 70 on bimetal 68 with a second terminal 82 of the transmitter. The transmitter preferably contains a self-contained source of operating power such as batteries 84 and 86. Battery 84 supplies power to the control circuit so that when contacts 62 and 64 of the thermostat are closed, current will flow from terminal 78 through line 76, thermostat coil 61, resistance heater 74, across closed contacts 72 and 70, through bimetal 68 and lead 80 to terminal 82.

Heat generated in resistance heater 74 will warp bimetal 68 upward, thus separating contacts 70 and 72, shutting off the current flow until bimetal 68 cools sufficiently to return to its normal position where the circuit through the thermostat will again be established. The parts of timer 60 are preferably proportoned and adjusted to have a short period when contacts 70 and 72 are closed and a long period when contacts 70 and 72 are open. A suitable timing arrangement may provide that current flow continues for only about one second when contacts 70 and 72 open, while about 60 seconds are required before the circuit is reclosed. Thus, the transmitter may be in operation for only about one second out of each minute during the period when the thermostat contacts 62 and 64 are closed. This time sharing mode of operation not only reduces the current drain on the batteries in the portable thermostat unit, but also reduces significantly objectionable radio frequency interference which would be caused if the transmitter were in operation continuously.

The oscillator circuit may be of any suitable conventional construction and may include for example, a 1.5 volt battery 84, a 90 volt battery 86, a triode tube 88, a plate tank loop 90, a modulation coil or transformer 92 and suitable condensers and radio frequency choke coils connected as shown in the circuit of FIGURE 3. When the external circuit through the thermostat and timer is closed, connecting terminals 78 and 82 to complete the circuit through the cathode of tube 88, radio frequency waves are generated. The carrier frequency of the oscillator circuit can be changed by adjusting tank loop 90 (which controls the carrier frequency) and the modulation frequency of the carrier wave, which may be in the audio range, may be adjusted by changing the value of capacitor 91 or inductance of modulation coil 92.

A single tube oscillator stage may produce adequate power that radiates from the plate circuit leads to operate a tuned receiver unit 100 at the side of the furnace (see FIGURE 2). As this oscillator circuit is of generally conventional construction, no further detailed discussion of its operation is believed necessary here. Also, it is apparent that other types of oscillator circuits could be used including a fully transistorized circuit which would offer the added advantage of reduced current drain on the batteries and elimination of the requirement for a 90 volt battery since transistors may be operated with significantly lower voltages.

To support the portable temperature control unit 54 so that it can be placed in a convenient location on a table or shelf, and to protect it from damage, the housing illustrated in FIGURE 4 may be used. Transmitter 56 and timer 66 may both be mounted in a sheet metal box 150. Thermostat 58 may be a commercial room temperature control enclosed in a metal case, may be secured to a face of box 150 as by screws. Thermostat 58 may be provided with a thermometer 162 to indicate the ambient temperature and a lever 164 for adjusting an indicated temperature setting at which the circuit is closed.

The portable temperature unit is, in accordance with one feature of this invention, mounted on a base which may be in the form of a wire frame 154. As mechanical vibrations and shocks will cause contacts on a bimetal to move between opened and closed positions, it is highly desirable to isolate these elements against vibration and shock. This may be accomplished by use of a resilient mounting arrangement for box 150 on wire frame 154. Such a resilient arrangement is illustrated as comprising four coil type tension springs 152.

Wire frame 154 may have a U-shaped front portion 156 that slopes rearwardly and upwardly and two legs 158 which extend rearwardly and can be placed on any horizontal surface. The coil springs 152 hook into loops 160 on the frame and into holes in tabs 162 attached to box 150, and are all under tension to thereby provide a resilient mounting for the thermostat and electronic circuit.

The furnace control unit 52 (see FIGURES 2 and 5) is supplied with operating power as from 120 volt lines L1 and L2, which are connected to receiving unit 100 at terminals 102 and 104, to the primary winding of a step-down transformer 106 at terminals 108 and 110, and to the series circuit of blower motor 32 and blower control 34 at terminals 112 and 114 respectively. Transformer 106 has a secondary winding which may provide about 25 volts for operation of solenoid operated fuel valve 46 and its controls.

Terminals 102 and 104 are connected to the receiver power transformer 116 (see FIGURE 5), supplying power to the receiver circuits. The radio frequency signal from transmitter 56 is picked up by antenna 118 on the receiver. The receiver includes one or more radio frequency amplifier stages 117, a first detector stage 119 tuned to the carrier frequency, two lower frequency amplifiers 121, a second detector 123 tuned to the modulation frequency here assumed to be an audio frequency, a modulation coil 125 and an output relay 120 in the plate circuit of power amplifier tube 127, as shown in the circuit diagram of FIGURE 5. As the various amplifier and detector stages of receiver circuit are of conventional design, no detailed description of the connection and operation of the various stages is believed necessary here for the understanding of its operation in this circuit. Other equivalent receiver circuits may be used including circuits utilizing transistors.

The receiver circuit is tuned to the particular radio frequency carrier wave transmitted by the portable thermostat transmitter unit of FIGURE 4 and hence will reject any radio frequency waves at other frequencies. Also, the audio amplifier and detector stages and particularly modulation coil 125, are tuned to the particular modulation frequency of the thermostat transmitter unit. In order for a signal to pass through the receiver circuit to amplifier tube 127, it is necessary that it not only be at the correct carrier frequency, but also at the correct modulation frequency. This significantly increases the insensitivity of the receiver circuit to undesired radiation and noise which might otherwise cause undesired operation of the heating unit.

When the coil of relay 120 is energized by the receiver output, contacts 122 and 124 close, completing a circuit through the low-voltage secondary winding 125 of transformer 106 and through a time delay means 128. Time delay means 128 may consist of a D.C. relay having coil 130, the terminals of which are connected across a series circuit containing a condenser 132 and a resistance 134. When contacts 122 and 124 are closed by the energization of relay 120, coil 130 will be energized by voltage from secondary winding 125 through a circuit including contacts 124, 122 and diode 133 thereby closing its normally-open contacts 136 and 138 and energizing the solenoid to operate valve 46 of the furnace unit. Although relay 120 is energized for only a short time interval, such as one second, by the signal received from the transmitter, condenser 132 becomes fully charged to the circuit voltage during this interval because of diode 135 which is so poled as to provide a low resistance charging current path. When the circuit is opened at contacts 122 and 124, condenser 132 will discharge through coil 130 and resistor 134 at a current rate sufficient to maintain relay 130 energized to hold contacts 136 and 138 closed until the time for the next signal to be received if the thermostat is still calling for heat. By selection of capacitor 132 to have an appropriately high value of capacitance and resistor to have an appropriately high value of resistance, relay 130 can be maintained in its energized condition for a period longer than that required for intervalometer 60 of the transmitter to reclose. Relay 130 is in effect a slow release relay, and if desired other techniques may be used to delay the drop out time of the relay such as a synchronous motor driven cam actuated contact. The important requirement is that the time delay provided is no less than the time interval between two successive transmitted pulses from the transmitter unit.

Closing of contacts 136 and 138 completes the circuit through the secondary winding of transformer 106 and valve 46, energizing the valve solenoid, which opens the valve to permit gas to flow to the burner 42 and supply heat to the house as the gas burns.

If radiation from the transmitter stops due to opening of thermostat contacts 62 and 64, then contacts 136 and 138 will open, thus closing valve 46, cutting off heat to the house.

Blower thermostat 34 is located where it is subjected to the heat within the furnace casing. When the furnace becomes warm from operation of the burner, contacts 140 and 142 will close, energizing the motor 32 and causing the blower to circulate heated air through the furnace ducts to the house.

While the foregoing describes the application of the invention to a gas-fired warm air furnace, it is to be understood that it may also be used to control any other type of heating and/or cooling apparatus, in which a conditioning unit in a fixed location is to be regulated to maintain a desired temperature at any desired point in the enclosure conditioned. The supply of fuel, or of heating or cooling medium may be modulated rather than being started and stopped, or the conditioning unit may be controlled by operation of a mixing valve regulating the proportion of heated and cooled fluid supplied to heat exchangers.

While the embodiment illustrated is a residential installation, the system may also be used in commercial or industrial temperature regulation.

Where zone control is desired, with separate air heating or cooling conditioners effective to separately control the temperature for each zone, a plurality of control thermostats may be supplied, each controlling a separate zone by being tuned to a different carrier frequency, so that there is no interference between the conditioning units and the thermostats for other zones.

Where two conditions, such as heating and cooling, are to be controlled, the transmitter may be tuned to send on either of two frequencies. For example, a double contact thermostat could be employed such as shown in FIGURE 6 where one pair of contacts is closed when the temperature is above the set value and a second pair is closed when the temperature is below the set value, each closing a circuit, and the circuits adapted to supply a signal at different carrier frequencies. One frequency is used to energize a cooling device, the other a heating device, through receiving circuits as previously described, each tuned to one of the two carrier frequencies.

Referring next to FIGURES 6 and 7 together, a system is illustrated wherein both a heating unit 200 and a cooling unit 202 are part of the air temperature conditioning means and different modulation frequencies are used on the same carrier frequency to selectively operate either the heating or cooling. The thermostat control unit of FIGURE 6 is substantially identical to the unit of FIGURE 3 and only the differences will be described. A manually operable heating and cooling selector switch is provided which has a first switch arm 204 that is optionally connectable to opposite ones of fixed contacts 206 and 208. Contacts 206 and 208 are electrically insulated from each other and may be mounted on plate 210 that is adjustable about pivot axis 212 and carries a pointer 213 which cooperates with a calibrated temperature scale. Such a heating-cooling thermostat is diagrammatically representative of those that are commercially available.

The manually operable heating and cooling selector switch also has another switch arm 214 that is ganged to move with switch arm 204. Switch arm 214 may be connected into the oscillator circuit so as to change the frequency of the generated signal when the selector switch is changed. In the illustrated embodiment, the circuit is altered by adding capacitor 216 when the thermostat selector switch is set to call for heat which alters the modulation frequency of the generated carrier wave.

Obviously, the circuit could be modified in other equivalent manners, such as by varying the inductance which controls the modulation to produce the same result. Also, it may be desirable in some installations to alter the carrier frequency as discussed above rather than a modulation frequency to provide one signal that is unique to the cooling system and another signal that is unique to the heating system.

Referring now to FIGURE 7, the radio frequency amplifier stage 218 receives the incoming carrier wave with modulation at either the cooling or the heating frequency. After the carrier frequency is removed by a first detector stage 220, the incoming signal is connected to the inputs of the cooling signal channel amplifier stages 222 and of the heating signal channel amplifier stages 224. Each of the signal channels is tuned to their respective modulation frequency and only one power amplifier stage 226, 228 will be provided with a signal at any one time to energize the relays 230, 232 controlling the respective cooling or heat unit 202 or 200. Switch contacts 234 for energizing relay 236 to apply power to cooling unit 202 and switch contacts 238 for energizing fuel value solenoid 240 to apply fuel to heating unit may be regarded as equivalent to contacts 138 in the system of FIGURE 5. The remainder of the system may operate in the manner as described above in connection with the embodiment illustrated in FIGURES 1-5, and no further description is believed necessary here.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a thermostat unit for a temperature control system:
   (a) an electronic oscillator circuit adapted to generate a carrier radio frequency signal;
   (b) a thermostat for control of heating and cooling and having contacts that open and close in accordance with air temperature;
   (c) circuit means to connect said contacts to selectively control operation of said oscillator circuit;
   (d) a manually operable selector means on said thermostat to set said thermostat to be operative to effect heating in one position and to effect cooling in another position of a heating and cooling apparatus, respectively;
   (e) first means to modulate said carrier radio frequency signal at a first frequency;
   (f) second means to modulate said carrier radio frequency signal at a second frequency; and
   (g) means connecting said manually operable selector means to select a predetermined one of said modulation means to thereby produce a unique signal to identify the setting of the manually operable selector means.

2. The thermostat unit as defined in claim 1 together with an intervalometer, means connecting said intervalometer to control operation of said oscillation circuit by periodically de-energizing said oscillator circuit when energized by said thermostat contacts to thereby cause the oscillator circuit to produce said radio frequency signal during time periods that are separated by periods of no signal.

3. A portable transmitter unit for a room temperature control system comprising in combination:
   (a) an electronic oscillator circuit;
   (b) a cordless power supply for said oscillator circuit;
   (c) a housing for said oscillator circuit and power supply;
   (d) a bimetal thermostat having switch contacts that are opened and closed in response to variations in the room temperature mounted on an exterior surface of said housing;
   (e) circuit means connecting said thermostat to selectively energize said oscillator circuit to transmit a radio frequency signal in accordance with the position of the thermostat switch contacts;
   (f) a base; and
   (g) means for resiliently supporting said housing on said base to reduce the effect of shock and vibration on said switch contacts.

4. The portable transmitter unit as defined in claim 3 wherein said base comprises a wire-like member having a pair of leg portions adapted to rest on a horizontal surface and upwardly extending portions located on opposite sides of said housing and said resilient support means comprises a plurality of tension spring members for vibrationally isolating said housing from said base.

5. The portable transmitter unit as defined in claim 3 together with a thermally actuated timing device having a bimetal and associated resistance heater with a switch contact on said bimetal for effecting a timed operation of said oscillator circuit when said thermostat switch contacts are closed.

6. A method of controlling an air temperature conditioning means at a location remote from a region whose air temperature is to be controlled by means of a thermostatically controlled electronic oscillator circuit for generation of radio frequency signals and a radio frequency receive circuit at a receiver station adjacent said air temperature conditioning means comprising the steps of:
   (a) energizing said oscillator circuit to produce a radio frequency carrier signal in response to deviations of the temperature in said region from a predetermined value;
   (b) modulating the carrier frequency signal with a first frequency identified with the heating means and with a second frequency identified with the cooling means;
   (c) amplifying said carrier frequency signal at said receiver station;
   (d) separately detecting said amplified modulation frequency signals to thereby energize one or the other of said heating and cooling means as determined by the modulation on the carrier frequency;
   (e) then amplifying said modulation frequency signal;
   (f) next detecting said amplified modulation frequency signal to produce a voltage used for controlling a relay; and
   (g) operating said air temperature conditioning means in response to energization of said relay.

7. In a temperature control system:
   (a) an air temperature conditioning means comprising both a cooling unit and a heating unit at a location remote from a region whose air temperature is to be controlled;
   (b) a portable thermostat unit at said region including:
      (1) an electronic oscillator circuit for producing radio frequency signals;
      (2) a source of electric potential in said portable unit for energizing said oscillator circuit;
      (3) means including switch contact means controlled by an air temperature sensitive element for connecting said source of electrical potential to energize said oscillator circuit;

(4) means for modulating the radio frequency signals at a first lower frequency when operation of the cooling unit is indicated and means for modulating the radio frequency at a second lower frequency when operation of the heating unit is indicated; and (c) a receiver station at the location of said air temperature conditioning means including:

(1) an antenna for receiving radio frequency signals produced by said portable thermostat unit;

(2) a first electrically actuated means for controlling the cooling unit;

(3) a second electrically actuated means for controlling the heating unit;

(4) circuit means connected to said antenna for energizing said electrically actuated means in response to reception of said radio frequency signals including a first amplifier stage having first and second signal channels tuned to said first and second lower frequencies respectively for selectively energizing either said first or said second electrically actuated means; and (5) means responsive to energization of said relays for controlling operation of the respective cooling or heating means to modify the temperature in said remote region containing said thermostat unit.

8. In a temperature control system:

(a) an air temperature conditioning means including both a heating unit and a cooling unit at a location remote from a region whose air temperature is to be controlled;

(b) a portable thermostat unit at said region including:

(1) an electronic oscillator circuit for producing radio frequency signals;

(2) a source of electrical potential in said portable unit for energizing said oscillator circuit;

(3) means for modulating the radio frequency signals at a first lower frequency when operation of the cooling unit is indicated and means for modulating the radio frequency signal at a second lower frequency when operation of the heating unit is indicated;

(4) an intervalometer operated from said electrical potential source; and (5) circuit means including contact means controlled by an air temperature sensitive element for connecting an electrical potential from said source to said oscillator circuit through said intervalometer; and (c) a receiver station at the location of said air temperature conditioning means including:

(1) an antenna for receiving radio frequency signals produced by said portable thermostat unit;

(2) a first slow release relay for the heating unit;

(3) a second slow release relay for the cooling unit;

(4) circuit means for selectively energizing one or the other of said relays in response to reception of said radio frequency signals, the time delay of said slow release relay being effective for said relay to remain energized during time intervals the oscillator circuit is de-energized by said intervalometer, and said circuit means including first and second circuits selectively tuned to said first and second lower frequencies respectively, for selectively energizing either said first relay or said second relay; and (5) means responsive to energization of said relays for controlling operation of said air temperature conditioning means to modify the temperature in said remote region containing said thermostat unit.

References Cited in the file of this patent

UNITED STATES PATENTS

| | | |
|---|---|---|
| 2,029,542 | Polin | Feb. 4, 1936 |
| 2,357,609 | Ray | Sept. 5, 1944 |
| 2,403,798 | Holmes | July 9, 1946 |
| 2,595,644 | Davis | May 6, 1952 |
| 2,642,228 | Machlet | June 15, 1953 |
| 2,992,120 | Elsken | July 11, 1961 |